United States Patent [19]
Klinner et al.

[11] 4,077,192
[45] Mar. 7, 1978

[54] CONDITIONING CROPS

[75] Inventors: Wilfred Erwin Klinner, Woburn Sands; Alan Winston Harris, Hitchin, both of England

[73] Assignee: National Research Development Corporation, London, England

[21] Appl. No.: 694,322

[22] Filed: Jun. 9, 1976

Related U.S. Application Data

[62] Division of Ser. No. 363,313, May 22, 1973, Pat. No. 3,977,165, which is a division of Ser. No. 245,819, Apr. 20, 1972, abandoned.

[30] Foreign Application Priority Data

Dec. 8, 1971 United Kingdom ............... 57064/71

[51] Int. Cl.² ............................................. A01D 43/00
[52] U.S. Cl. .................................. 56/16.4; 56/DIG. 1
[58] Field of Search ................... 56/1, DIG. 1, 14.4, 56/500, 503, 16.4, 16.5, 16.6, 12.7

[56] References Cited

U.S. PATENT DOCUMENTS

| | | | |
|---|---|---|---|
| 2,506,054 | 5/1950 | Agee et al. | 56/12.7 |
| 3,596,445 | 8/1971 | Lievers et al. | 56/13.7 |
| 3,606,748 | 9/1971 | Middlesworth | 56/294 |
| 3,676,988 | 7/1972 | Hauser-Lienhard | 56/1 |
| 3,699,755 | 10/1972 | Hauser | 56/16.4 |
| 3,754,384 | 8/1973 | Case et al. | 56/14.4 |

FOREIGN PATENT DOCUMENTS

| | | | |
|---|---|---|---|
| 2,028,607 | 1/1971 | Germany | 56/503 |
| 645,098 | 10/1950 | United Kingdom | 56/DIG. 1 |
| 662,303 | 12/1951 | United Kingdom | 56/DIG. 1 |

Primary Examiner—Russell R. Kinsey
Attorney, Agent, or Firm—Cushman, Darby & Cushman

[57] ABSTRACT

An agricultural implement for conditioning a crop comprising a plurality of beaters mounted for rotation about a common axis, a cutter for cutting a crop, and mounting means for mounting the beaters and cutter, during a cutting operation, in cooperating relationship such that the beaters engage crop cut by said cutter before said cut crop falls to the ground, and condition said crop. The cutter may be a horizontal reciprocatory cutter mounted across the line of travel of the implement or may be a rotary drum, disc or the like.

15 Claims, 15 Drawing Figures

CONDITIONING CROPS

This application is a division of Ser. No. 363,313, filed May 22, 1973, now U.S. Pat. No. 3,977,165, which is a division of Ser. No. 245,819 filed Apr. 20, 1972 (now abandoned).

The present invention relates to an implement for conditioning crops.

Conditioning a crop is a conventional process whereby the crop is lacerated and bruised in order to improve its properties. For example, conditioning may be carried out in order to increase the rate of loss of moisture from the crop when it lies in the field after cutting.

It is an object of the present invention to provide an improved implement for conditioning a crop.

According to the present invention, there is provided an agricultural implement for conditioning a crop comprising a frame, a plurality of beaters for conditioning crop, first mounting means for mounting said beaters on said frame for rotation about a common axis, a cutter, said cutter having at least one cutting element for cutting a crop by movement of said cutting element relative to said frame, second mounting means mounting said cutting element or elements independently of said beaters, and means for driving said beaters in rotation about said axis, said first mounting means in cutting operation of said implement mounting said beaters in cooperating relationship with said cutter to engage crop cut by said cutter before said cut crop falls to the ground and to condition said crop.

Preferably, the frame and the beaters are so arranged that in operation the common axis of rotation of the beaters is substantially horizontal and extends across the intended direction of travel of the implement, for example, at right angles to that direction. By substantially horizontal is meant that said common axis is horizontal or approximately horizontal when the implement is traversing horizontal ground.

The said first mounting means may mount said beaters with said common axis of rotation substantially directly above said cutter.

Said cutter may be a reciprocatory cutter in which at least one cutting element is reciprocatory across said intended direction of travel of the implement.

Alternatively, said cutter may be a rotary cutter in which said one cutting element is mounted for rotation about a substantially vertical axis. Such a cutter may be of the type found in rotary mowers such as disc drum or like mowers.

Each beater may be arranged to be yielding upon impact with an obstacle more solid than the crop to be conditioned.

Each beater may be formed at least in part of resilient material.

Each beater may be pivotable, upon an impact such as aforesaid, between an operating position in which the beater angle relative to a radius of said common axis passing through the pivot point of the beater is a predetermined angle and a relief position in which the beater angle is greater than the said predetermined angle.

Said predetermined angle may be zero so that each beater is pivotable, upon an impact such as aforesaid, between an operating position in which the beater lies along a radius of the said common axis and a relief position in which the beater is at an angle to the said radius.

There may be provided means for varying the predetermined angle which may be set at, for example, 15° or 30°. By way of example, said predetermined angle may be set between 10° and 20° or between 25° and 35°.

In operation, the beaters may be urged to or constrained in the operating positions, for example, by centrifugal action, by shear pins or by spring means acting against stops.

The beaters may be mounted in groups in such a manner that the beaters of each group are fixed relative to each other, but are movable upon an impact such as aforesaid relative to beaters in other groups.

The beaters of each group may be mounted on a common support member which is pivotable about an axis parallel to, but spaced from, the said common axis.

Each beater may include an arm hinged at one end and fins disposed in the form of a V secured to the other end of the arm with the apex of the V-form directed towards the hinged end. The fins may be straight or twisted to increase the area of impact with the crop.

Preferably, the beaters are so disposed that in operation the tips of the beaters tend to clear the cutter of crop. The means for driving the beaters in rotation may be arranged to rotate the beaters in such a sense that, at the lowermost point of movement of each beater, the beater moves in the same direction as the direction of movement of the implement over the ground when in use. In such an arrangement, the beaters may be so disposed that in operation the beaters tend to raise the crop and position the crop in a position suitable for cutting.

Means may be provided for defining, with the paths travelled by the tips of the beaters, a chamber through which crop is carried by the motion of the beaters and in which chamber the crop is conditioned by cooperation of the beaters and the said defining means.

Embodiments of the present invention will now be described, by way of example, with reference to the accompanying drawings, in which.

Figure 1:
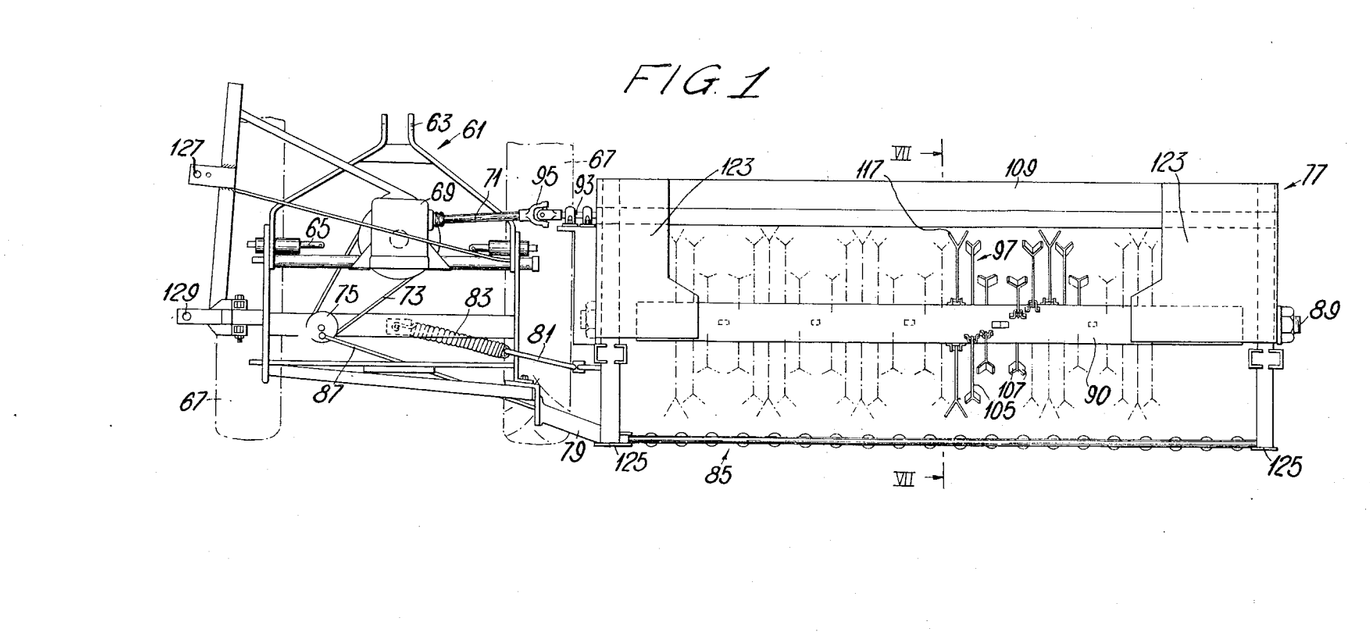
FIG. 1 illustrates a rear elevation of an agricultural implement in accordance with the present invention.
Figure 2:
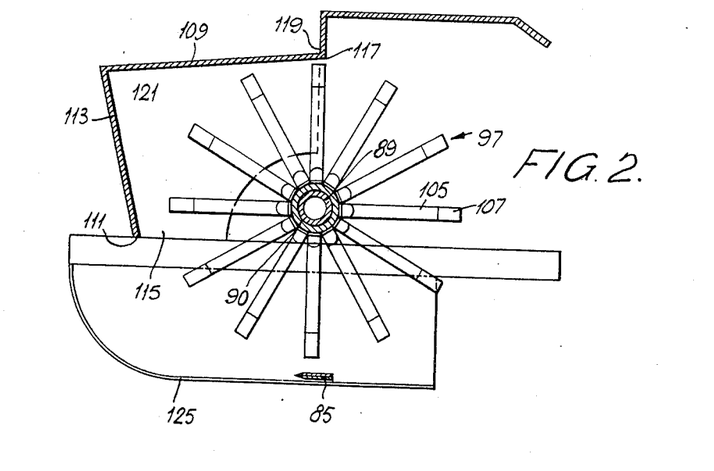
FIG. 2 illustrates a view on the line VII—VII in FIG. 1.

The implement illustrated in FIGS. 1 and 2 is intended to be mounted on the three-point linkage of an agricultural tractor (illustrated in broken lines).

The implement includes a cutter which, in the present embodiment, is a reciprocatory cutter driven from the power take-off of the tractor through a pitman. The reciprocatory cutter is of a known form, including a reciprocatory cutting element comprising a bar carrying cutter blades slidable through a plurality of forwardly-facing fingers.

The embodiment illustrated in FIGS. 1 and 2 includes beaters in the form of flails which are formed of rigid material and are hingedly connected to a shaft driven in rotation. Such flails achieve an effect of resilience from the centrifugal force acting on the flails when they are rotated, which force tends to maintain the flails in radial dispositions.

The implement illustrated in FIG. 1 has a frame which includes a sub-frame 61 having upper 63 and lower 65 points for connection to the three point linkage of a tractor, only the tires of which are shown in broken lines at 67. The sub-frame 61 carries a gear-box 69 driven by the power take-off of the tractor. The gear-box 69 has an output shaft 71 extending laterally and a V-belt 73 which drives a pulley 75 also mounted on the frame 61.

The frame of the implement also includes a framework generally designated 77 which is mounted from the sub-frame 61 by a lower, break-away linkage 79 and an upper resilient linkage 81 which includes a spring 83.

The framework 77 carries a reciprocatory cutter 85 which is driven by a pitman 87 extending from an eccentric pin on the pulley 75. The framework 77 also carries a shaft 89 which is disposed parallel to and above the cutter 85. The position of the shaft 89 in the direction fore and aft of the framework 77, i.e. in a horizontal direction normal to its axis, may be selected and the height of the shaft 89 above the cutter may also be selected. Journalled on the shaft 89 is a tubular member 90 which is driven in rotation by a chain trained about tooth wheels on the member 90 and on a shaft 93 which is driven in rotation through a universal coupling 95 by the shaft 71 extending from the gear-box 69.

Figure 3:
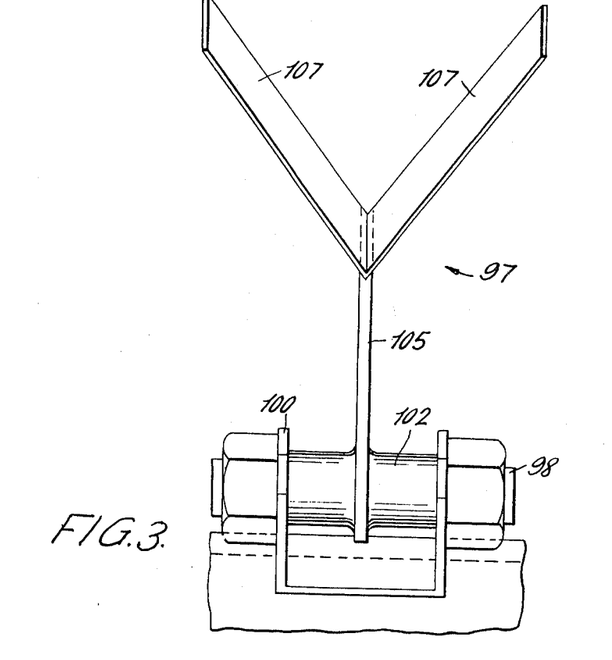
FIG. 3 illustrates a view of a flail embodied in the arrangement illustrated in FIGS. 1 and 2.

The tubular member 90 carries a plurality of flails 97. As can be seen in FIG. 3, the flails 97 are journalled on pins 98 carried by brackets 100 on the tubular member 90. The axes of the pins 98 are parallel to the axis of the tubular member 90. The flails 97 are disposed in pairs and the members of each pair are disposed at opposite sides of a diameter of the tubular member. The pins 98 at the right side of the middle of the axial length of the tube 90 lie on two helices of one hand (of which one helix is shown) and the pins 98 at the other side of the middle of the axial length of the tubular shaft 90 lie on two helices of the opposite hand (not shown).

As can be seen in FIGS. 1 and 3, each flail includes a tubular portion 102 disposed about and rotatable relative to the pin 98 and located between the arms of the bracket 100. Extending from the tubular portion 102 and secured thereto, as by welding, is an arm 105 which carries, at its end remote from the tubular portion 102, two fins 107. The arm 105 and fins 107 are formed of strip steel. The plane of arm 105 is normal to the axis of the pin 98. The planes of the fins 107 are such that they present an edge when considered in the circumferential direction of the path swept by them when they are rotated by rotation of the tubular member 90. The included angle between the fins 107 is approximately 60°.

As shown in FIG. 2, mounted above and in front of the flails is a shroud 109. The lower edge 111 of the forward, upstanding portion 113 of the shroud is disposed beneath the horizontal plane containing the axis of rotation of the tubular shaft 90. The distance between the edge 111 and the path swept by the tips of the fins 107 is adjustable, for controlling the degree of conditioning, by moving the upstanding portion 113 of the shroud fore or aft, i.e. left or right in the plane of FIG. 2, and/or by moving the position of the dead shaft 89 fore or aft. The region between the lower edge 111 and the adjacent portion of the path swept by the tips of the fins 107 constitutes a first clearance 115. A second clearance 117 is formed between the path swept by the tips of the fins 107 and the portion 119 of the shroud 109 disposed vertically above the shaft 89. The shroud 109 diverges from the path swept by the tips of the fins 107 in the region between the first and second clearances to bound a chamber 121. The shroud 109 extends rearwardly from the portion 119 thereof to prevent conditioned crop leaving the second clearance 117 being thrown upwardly.

Baffles 123 (FIG. 1) are provided behind the flail arrangement to direct crop conditioned by the flails on the end portions of the tubular shaft 90 towards the center of the path travelled by the implement so that the conditioned crop is out of the way of the wheels 67 of the tractor upon a subsequent traverse of the implement and tractor.

Skids 125 are provided on the underside of the framework 77 at the extremities of the cutter 85.

The sub-frame 61 is provided with a second set of upper 127 and lower 129 linkage points for connection to the three point linkage of the tractor. This second set of linkage points is disposed at the side of the sub-frame 61 remote from the flail arrangement and is disposed in a plane at right angles to the first set of linkage points. The second set of linkage points serves for transporting the implement, as on a road, with the implement extending behind the tractor rather than laterally of the tractor.

Figures 7, 8, 9:
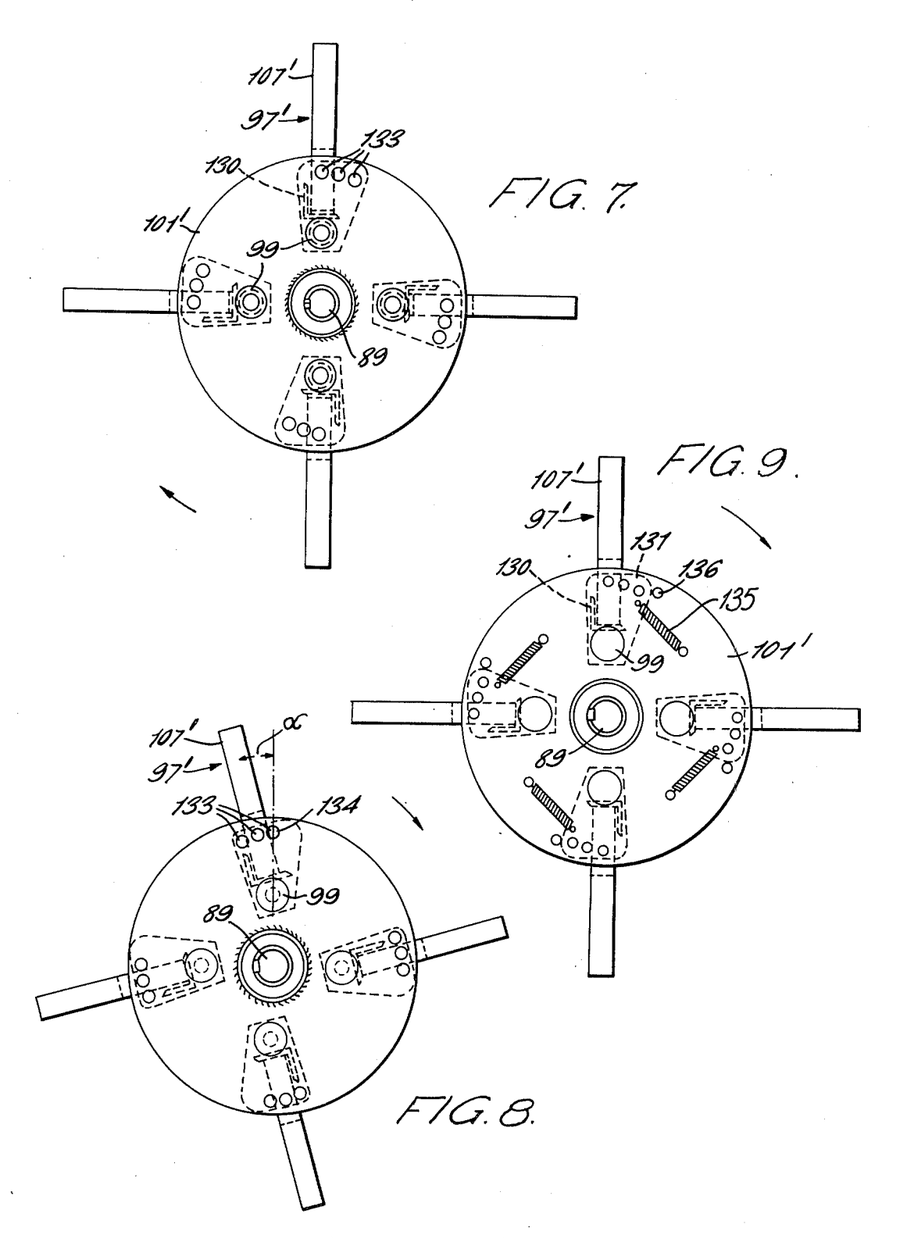
FIG. 7 is an end view of part of the beater assembly taken in the direction II in FIG. 4 and illustrates a free pivoting beater assembly.
FIG. 8 is an end view of part of a beater assembly similar to the view of FIG. 7 but illustrating an alternative beater assembly using shear pins.
FIG. 9 is an end view similar to the view of FIG. 7 but showing an alternative beater assembly in which the beaters are spring biased against a stop pin.

In operation, the cutter 85 is reciprocated by the power take-off of the tractor through the gear-box 69, V-belt 73, pulley 75 and pitman 87. The tubular member 90 is driven in rotation by the power take-off of the tractor through the gear-box 69, shaft 71, universal coupling 95, shaft 93 and chain. The direction of rotation of the tubular member 90 is clockwise as seen in FIG. 7, that is, with the tips of the flails moving forwardly over the cutter 85 at the lower extremity of their paths of rotational movement about the shaft 89.

Crop cut by the cutter 85 is carried forwardly and upwardly by the flails in the first quadrant of their movement away from the cutter 85 and is carried through the first clearance 115 wherein the crop is conditioned, i.e. bruised and lacerated. After passing through the first clearance 115, the crop passes into the chamber 121 wherein it spreads and is tossed around before being carried through the second and smaller clearance 117 wherein it is further conditioned before being discharged rearwardly.

It has been found that crop does not cling to the particular form of flails 97 described and illustrated because any crop tending to cling to the arm 105 or fins 107 is thrown off by centrifugal force.

The flails are illustrated in FIG. 2 in the dispositions which they assume when the tubular member 90 is rotated, that is, the flails are disposed generally radially of the shaft, by virtue of the centrifugal force. However, should one or more flails hit an obstruction such as a stone or a post, then the flail or flails will be deflected and move about their mounting pins 98 without causing destructive damage to the flails. The flails will resume their radial dispositions after the obstruction is cleared. Each flail defines a conditioning element and includes two outwardly extending arms in the form of fins, each arm having a length preferably at least four times its width taken in a direction along the axis of the rotor.

The paths swept by the fins of flails, which are adjacent one another in the axial sense, overlap. It has been found that such overlap prevents crop getting to and wrapping around the tubular member 90.

Referring now to FIGS. 4-9, there will be described a further embodiment of the invention. Many elements shown in FIGS. 4-9 correspond to like elements shown in FIG. 1 and are indicated by like reference numerals. As in the embodiment of FIG. 1, the implement is intended to be mounted on the three point linkage of the tractor. The supporting and driving elements 61-85 correspond to those of FIG. 1. The cutter 85 is of known form, including a reciprocatory cutting element comprising a bar carrying cutter blades slidable through a plurality of forwardly facing fingers. The shaft 89 which is disposed parallel to and above the cutter 85 in a horizontal position extends across the intended direction of travel of the implement. The position of the shaft 89 may be adjusted in the direction fore and aft of the framework 77, that is, in a horizontal direction normal to its axis, and the height of the shaft 89 above the cutter may also be selected. Journalled on the shaft 89 are two tubular members 91 and 91' which are fixedly secured together on a common axis by a central flange 101. The tubular members 91 and 91' are driven in rotation by a chain trained about toothed wheels on the member 91 and on a shaft 93 which is driven in rotation through a universal coupling 95 by the shaft 71 extending from the gear-box 69. (It will be appreciated that the shaft 89 may alternatively be replaced by a driven shaft to which the beater assembly to be described hereinafter is fixedly secured.)

Figure 6:
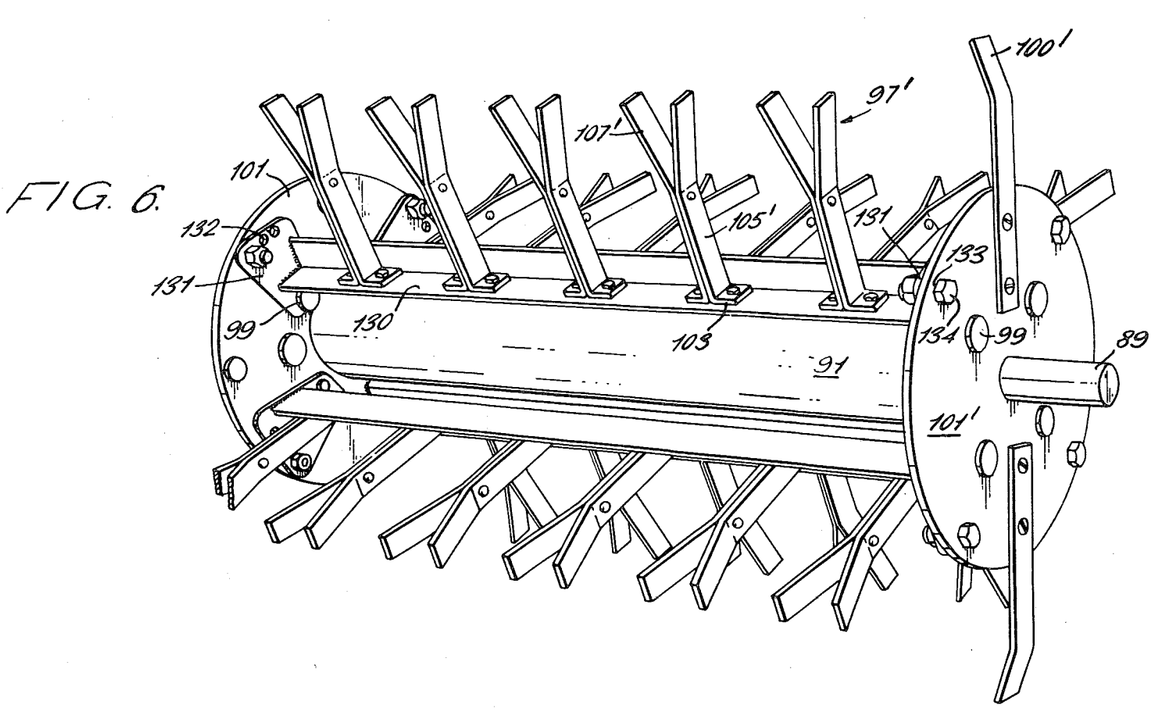
FIG. 6 is a perspective view of half the beater assembly shown in FIG. 4.

The two tubular members 91 and 91' form part of a beater assembly which also comprises the central flange 101, two end flanges 101' and 101" and a number of beater bars mounted between pairs of flanges and supporting groups of beaters 97'. The end flanges 101' and 101" are in register with the central flange 101 and fixedly secured to those ends of the tubular members 91 and 91' which are remote from the central flange 101. As is best shown in FIG. 6, each beater bar 130 comprises a right angle section steel bar secured, for example, by welding, to end plates 131 and which are positioned at either end of the beater bar normal to the length of the bar. Each end plate 131 is pivoted on the associated flange 101, 101' or 101" to allow rotation of the beater bar 130 about an axis parallel to and spaced from the shaft 89. The plates 131 are arranged so that the beater bar 130 is spaced further from the shaft 89 than the pivot pin 99. Spaced further again from the shaft 89 on each of the end plates 131 are a number of adjustment holes 132 which, by rotation about the pivot pin 99, may be aligned selectively with an adjustment hole 133 in the associated flange 101, 101' or 101". Each end flange 101' and 101" carries a knife 100'0 to cut a clean edged swathe in operation.

The beater assembly has three illustrated modes of operation shown particularly in FIGS. 7, 8 and 9, respectively. In the first mode, shown in FIG. 7, each beater bar is allowed to rotate freely on its pivot pins 99 so that, in operation, the beaters 97' are thrown out to a radial operating position.

In the second mode, shear pins 134 are secured through the adjustment holes 133 on the flanges 101', and through selected adjustment holes 132 in the end plates 131. Corresponding shear pins are inserted through the holes 133 in the other end plates 101 and 101". This arrangement allows the beaters to be rotated in an operating position which has a selected, predetermined angle to the strictly radial position, the angle being indicated in FIG. 8 as α. The selectin of the adjustment holes 132 allows variation of the angle, for example, to angles of 15° or 30°. If required, the beaters may be secured in a strictly radial position.

In FIG. 9, there is shown a third mode of operation of the beater assembly, where tension springs 135 are provided linked between each end plate 131 and the associated flange 101, 101' or 101". The springs urge the beaters into a radial operating position against stop pins 136 projecting from the associated flange and engaging the edges of the end plates 131. Thus, even when the beater assembly is stationary, the beaters are maintained in the radial operating positions by the tension springs and remain in those positions during operation. The tension spring is arranged to be on the leading side of the beater assembly during rotation, as is the stop pin 136.

Further combinations of these modes may be utilized. For example, the beaters may be free swinging against stops which define the beater angle in the operating position as a predetermined angle, or the beaters may be spring biased against such stops.

Considering the three modes of operation, it will be seen that each mode allows the beaters to be yielding upon impact with an obstacle more solid than the crop which is being conditioned. Upon such an impact, the beater bar pivots backwards and the beaters pivot to a relief position. In the first mode of operation shown in FIG. 12, the centrifugal action of rotation of the beaters maintains the beaters in the operating position but allows yielding movement away from the operating position upon striking an object.

In the arrangement of FIG 8, in the second mode of operation, the beaters are yielding upon impact with an obstacle by virtue of the shear pins 134. It is a particular advantage of the invention that if, in operation, after striking an obstacle, one of the shear pins is sheared, it is not necessary to stop the conditioning operation to replace the shear pin. This is because the beater bar, from which the shear pins have been removed, reverts to the first mode of operation and can continue so to operate until replacement of the shear pins at a later, more convenient time.

In the arrangement of FIG. 9, the beaters are yielding upon striking an object by virtue of the extension of the tension springs 135 upon such impact. After such an impact, the beater assembly automatically returns to the operating position.

It will be appreciated that it is a particular advantage of the present invention that embodiments can be constructed allowing a choice of mode of operation in the field according to the particular crop to be conditioned. Thus, shear pins and springs can easily be added or removed and adjustment of the angle α can be made from time to time during conditioning operation. By way of example, the angle α may conveniently be chosen between 10° and 20° and between 25° and 35°.

As can be seen in FIG. 6, each beater includes a base portion 103 secured to the beater bar 130. Extending from the base portion 103 and integral therewith is an arm 105' which carries, at its end remote from the base portion 103, two fins 107'. The base portion 103, arm 105' and fins 107' are formed integrally of strip steel. The plane of the arm 105' is normal to the axis of the pin 99. The planes of the fins 107' are such that they present an edge when considered in the circumferential direction of the path swept by them when they are rotated by rotation of the tubular member 91. The included angle between the fins 107' is approximately 30°.

An alternative arrangement for the shape of the ends of the beaters is a beater having a Y-shaped tip but with the upper ends of the Y twisted to increase the area of impact.

Further alternative yielding means which may be incorporated into the beater mountings include metelastic type rubber mountings or the use of a detent system with spring loaded projections from the end plates engaging detents on the flanges, or vice versa.

Figure 4:
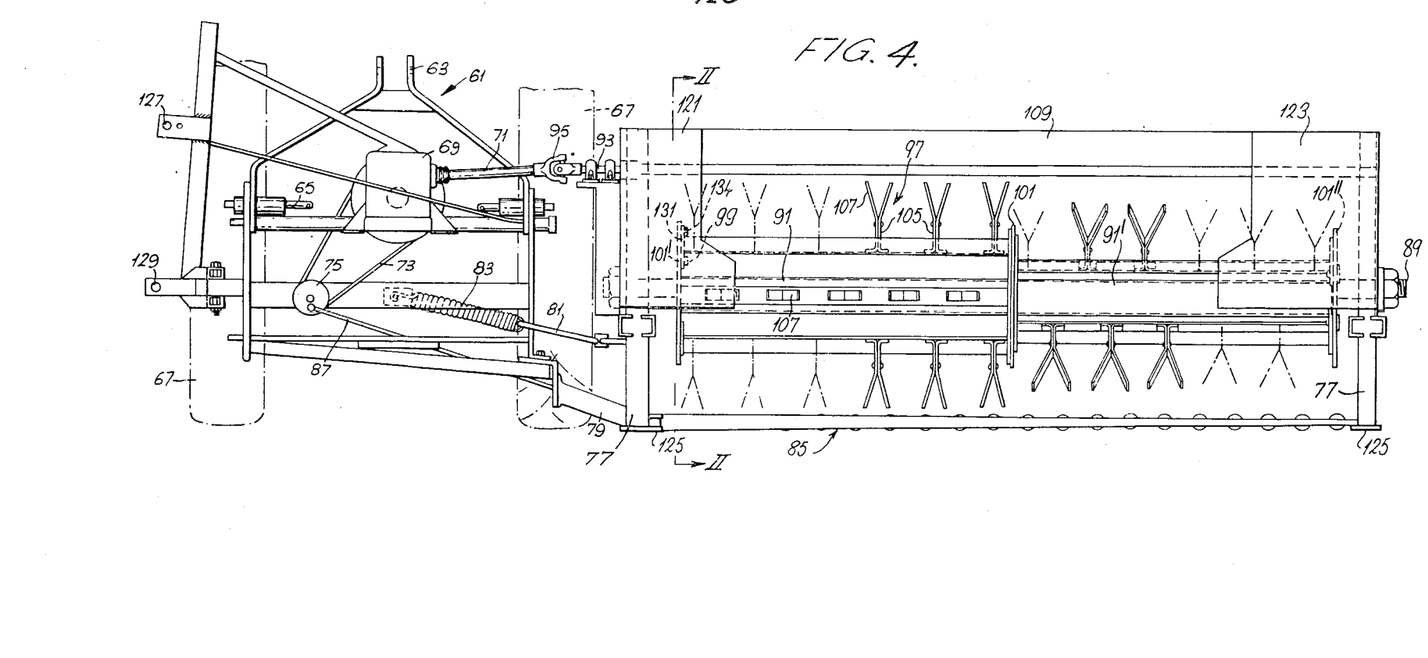
FIG. 4 is a rear elevation of an agricultural implement embodying the present invention.

Considering again the general beater arrangement shown in FIGS. 4 and 6, the beater bars 130 are arranged symmetrically about the axis of the shaft 89 but the beater bars of the two tubular members 91 and 91' are arranged to be 45° out of phase with each other to reduce drive load peaks on the driving mechanism. The spacing between the beaters 97' on adjacent beater bars is such that the paths swept by the beaters of adjacent beater bars upon rotation of the tubular member abut or, as shown in FIG. 9, overlap one another. That is to say that the base portions 103 of beaters 97' on each beater bar are positioned in line with the gaps between base portions 103 on the next adjacent beater bar. It is not essential that the tips of the beaters follow paths which abut or overlap each other, but this is a preferred arrangement, as it is found to reduce the amount of crop which becomes entangled with the beaters.

Figure 5:
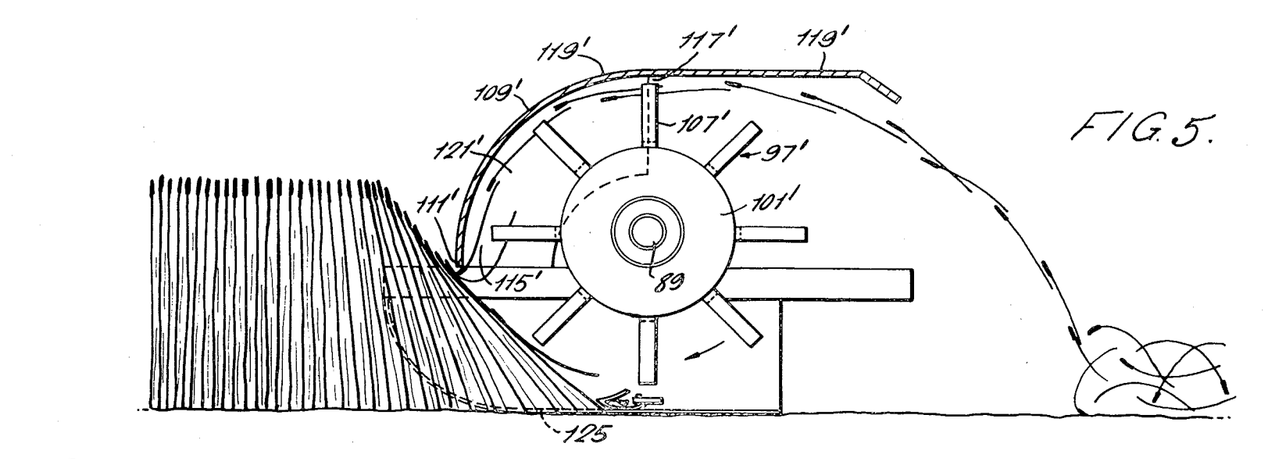
FIG. 5 is an end view in the direction II in FIG. 4 after removal of the tractor and three point linkage.

Referring to FIG. 5, there is mounted above and in front of the beaters a shroud 109'. The lower edge 111' of the shroud is disposed beneath the horizontal plane containing the axis of rotation of the tubular members 91 and 91'. The distance between the edge 111' and the path swept by the tips of the fins 107' may be adjustable, for controlling the degree of conditioning, by moving the shroud fore or aft, i.e. left or right in the plane of FIG. 10, and/or by moving the position of the shaft 89 fore or aft. The region between the lower edge 111' and the adjacent portion of the path swept by the tips of the fins 107' constitutes a gap 115'. The shroud 109' follows the path swept by the tips of the fins 107' to bound a chamber 121'. The shroud 109' extends rearwardly and downwardly from a portion 119' at the end of the chamber 121' to prevent conditioned crop leaving the chamber 121' being thrown upwardly.

The diameter of the beater assembly to the tips of the beaters may, for example, be 22 inches. Typically, in one arrangement, the axis of the shaft may be positioned 40 mm to the rear of the reciprocating blade of the cutter 85 and the clearance between the tips of the beaters and the shroud edge 111 may be 60 mm.

In operation, the cutter 85 is reciprocated and the tubular members 91 and 91' are driven in rotation by the power take-off of the tractor as described with reference to FIG. 1. The direction of rotation of the tubular members 91 and 91' is clockwise as seen in FIG. 5, that is, with the tips of the flails moving forwardly over the cutter 85 at the lower extremity of their paths of rotations movement about the shaft 89.

Crop cut by the cutter 85 is carried forwardly and upwardly by the beaters in the first quadrant of their movement away from the cutter 85 and is carried through the gap 115' to the chamber 121' wherein the crop is conditioned, i.e. bruised and lacerated. For many crops, it is an advantage that, in the arrangement shown, the crop is passed through the chamber 121' stem first and remains in this alignment while being conditioned. This produces the effect that the thicker parts of the crop which require most conditioning receive most bruising and lacerating from the beaters. This is in distinction to many other forms of conditioning apparatus in which the conditioning elements tend to work mainly on the upper, more fragile parts of the crop. Thus, in a preferred embodiment of the present invention, the front of the housing bends the crop forward putting the stems under stress just before cutting. After cutting, the butt ends spring into the paths of the beaters which bend them sharply upwards and accelerate the plants in the same direction as the rotation of the beater assembly.

It has been found that the movement of air created by the beaters during the first quadrant of their movement away from the cutter 85 is such as to place the crop in a favorable condition for cutting. Such positioning can also be effected by direct contact between the beaters and the uncut crop. Also the fact that the tips of the beaters when adjacent the cutter 85 are moving forwardly over the cutter tends to clear the cutter 85.

An implement embodying the invention may be embodied in a harvester which includes a device for chopping crop coming from the implement and a device for delivering chopped crop from the chopping device to a container for transport. Such a harvester may be regarded as resembling a forage harvester but it has the advantage over a conventional forage harvester that, without substitution of components, it can be used for harvesting a standing crop or a previously cut and wilted crop.

The implement may be modified so that the beater assembly may be moved to a position forward of and lower than that illustrated in FIGS. 1 and 2 so that, with the cutter 85 masked, rendered inoperative or removed, the implement may be used for conditionaing and tedding an already cut crop lying on the ground.

It has been found that the crop issuing from the implements described above is well fluffed up so that air circulation is facilitated and that the crop is lacerated and bruised, i.e. conditioned, so that the rate of loss of the moisture in the crop is improved.

If a crop to be cut and conditioned is found to be laid, the beater arrangement is moved forwardly of the cutter so that it tends to raise the crop and position the crop favorably for cutting.

It has been found that the implement may also be superior to a conventional reciprocatory cutter in avoiding blocking of the cutter in laid crops, particularly when the beater arrangement is positioned forwardly.

The facility for selecting the height of the beater arrangement relative to the cutter is optional but it is thought that it may be desirable to select different heights for different crops and crop conditions.

Other forms of beater may be incorporated in an implement in accordance with the present invention and amongst such other forms of flail may be mentioned a flail of which only a portion adjacent its base is elastic, the remainder being rigid, and a beater which is formed of rigid portions hingedly or otherwise connected to allow relative movement between the portions.

Whilst the invention has been described above in embodiments in which the cutter is a reciprocatory cutter, it is to be understood that other forms of cutter, for example, multiple disc rotary mowers may be used in carrying the invention into effect.

One of the main features of embodiments of the present invention is that the implement can be made versatile and adaptable to differing crop conditions. For example, the severity of treatment of the crop can be adjusted by varying the flail angle so that the rest of the mower conditioner can be made more simply and less flexibly designed. Many of the adjustments of the shroud which have been described by way of example may thus be dispensed with in practice.

The various modes of operation described each have advantages which are useful in particular conditions. For example, a grouping of beaters on a common pivoted beater bar results in simplicity, cheapness of production and ready replacement of individual beaters and component parts of the beater assembly.

Greater momentum at the tips of the beaters may be attainable than with individually pivoted beaters and this can result in a more uniform bruising of the crop. Where appropriate, this can be arranged to give better clearing of the cutter bar working beneath the beater assembly.

The feature of locking the beater bars in substantially radial position can reduce the power requirement for operation but maintain a high level of severity of crop treatment where this is required.

The feature of locking the beater bars in selected positions to reduce the impact angle under certain working conditions and, at the same time, increase the clearance between the beater tips and the shroud allows a control means for decreasing the severity of crop treatment. In such circumstances, this will, of course, also result in less power being used. The use of shear pins provides overload protection but still allows satisfactory performance by reverting to the free pivoting mode if one of the shear pins fails.

Figure 10:
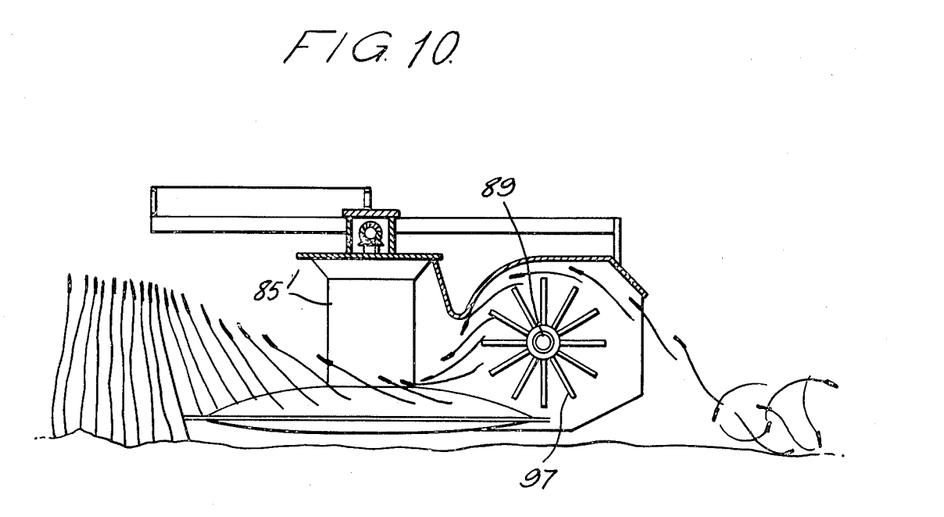
FIG. 10 is a diagrammatic representation of an alternative implement embodying the invention and including a rotary cutter.

FIG. 10 is a diagrammatic representation of an alternative embodiment of the invention in which the reciprocatory cutter 85 of FIG. 1 is replaced by a rotary cutter 85'. FIG. 10 is given merely to illustrate one possible general layout of such an alternative and elements corresponding to elements described with reference to FIG. 1 are indicated in FIG. 10 by corresponding reference numerals.

There will now be described, with reference to FIGS. 11-14, an adaptation of the agricultural implement for cutting and conditioning a crop which has been described with reference to the previous FIGS. 1-9. The adaptation is concerned with the coupling of the cutting and conditioning implement to a conventional forage harvester.

Figure 11:
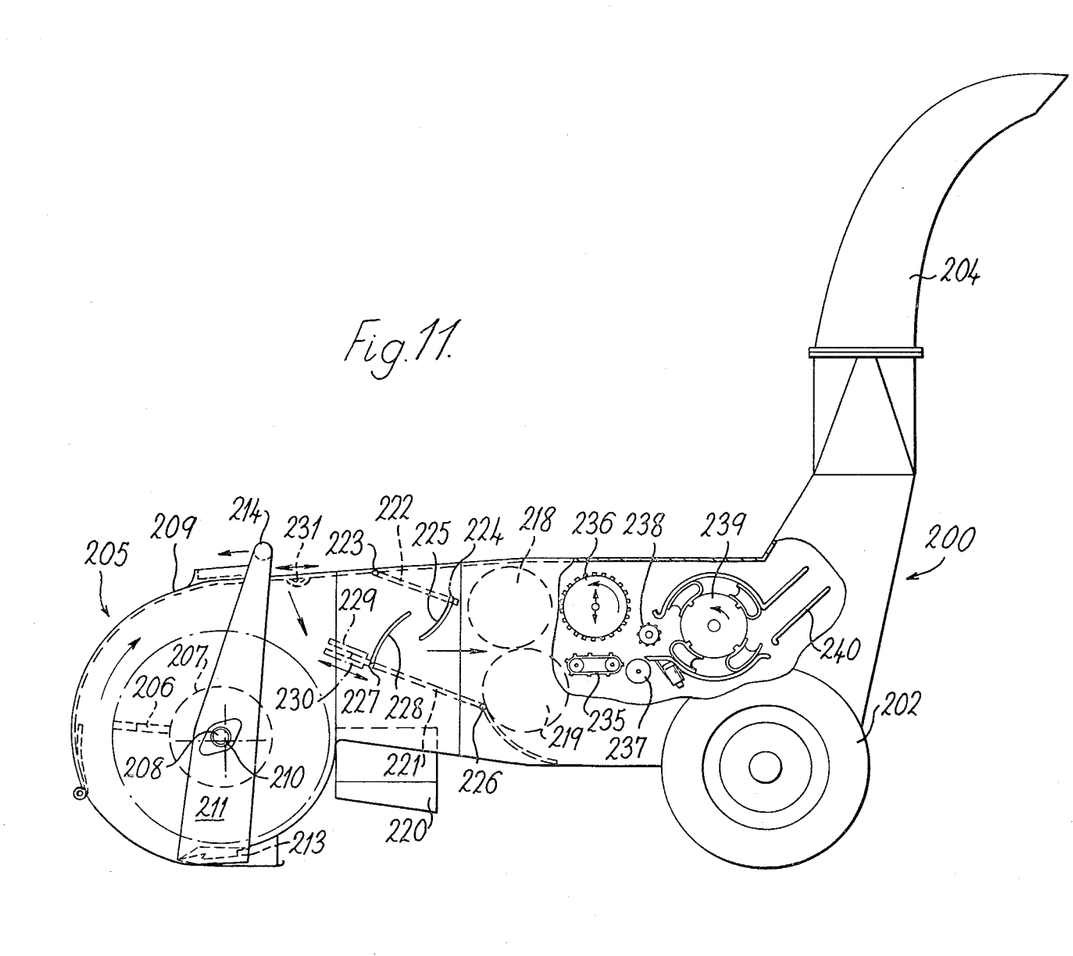
FIG. 11 is a side view partly in section of an implement embodying the invention coupled to a forage harvester and arranged in a first cutting disposition.
Figure 12:
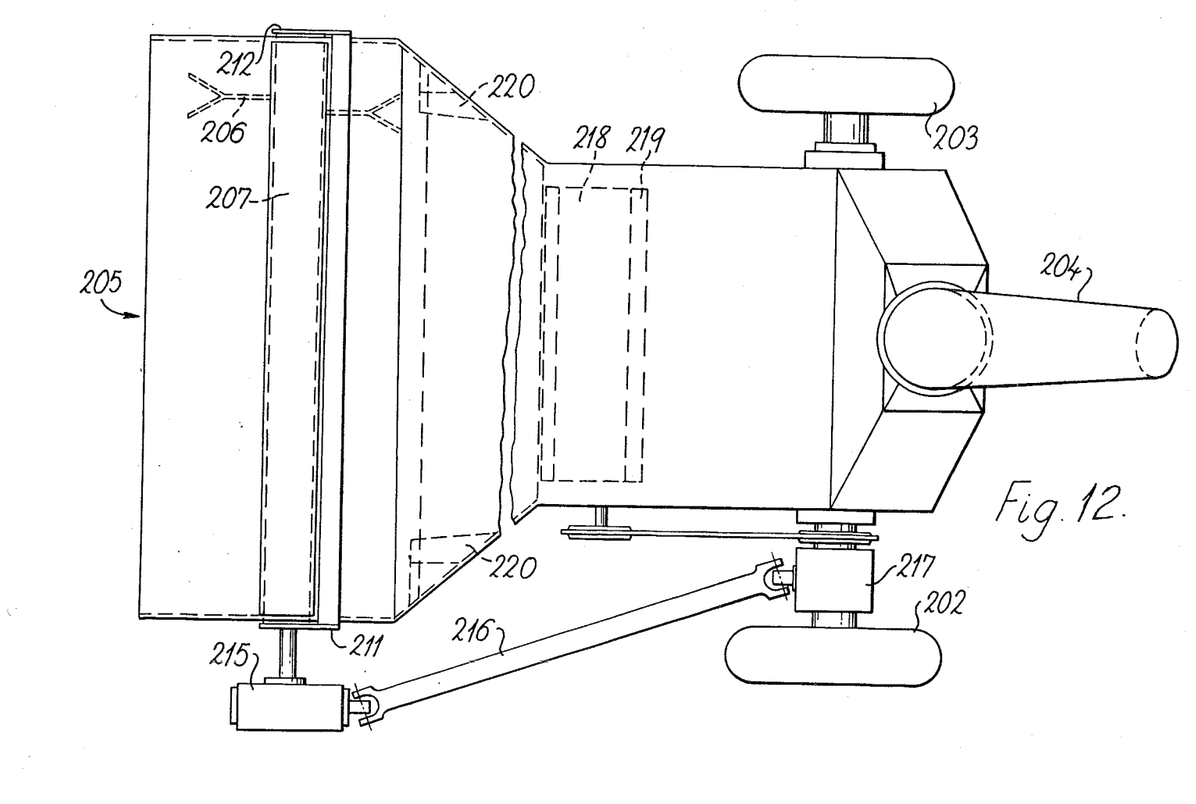
FIG. 12 is a plan view of the embodiment of FIG. 11.

Referring firstly to FIGS. 11 and 12, a conventional forage harvester indicated generally at 200 comprises a main frame and general housing 201, a pair of land wheels 202 and 203 and an output device 204 for transferring chopped crop to a container for transport.

The housing 201 is coupled to a cowling shroud 209 of an agricultural implement for cutting and conditioning a crop indicated generally at 205. The coupling preferably allows articulation. As the agricultural cutting and conditioning implement may be substantially the same as described with reference to previous figures, the details of the implement will not be described. The implement comprises essentially a plurality of beaters 206 mounted on a rotor 207 for rotation about a rotor axis 208 and a reciprocatory cutter 213 mounted on side members 211 and 212.

The cutter 213 and the beater rotor 207 are pivoted by way of the side members 211 and 212 about a pivot axis 210 spaced from the rotor axis 208. Pivot means allow rotation of the cutter 213 between a first cutting disposition which will be described with reference to FIG. 11 and a second non-cutting disposition which will be described hereinafter with reference to FIG. 13.

Thus the beaters 206 are mounted on a first mounting means comprising the rotor 207 and the cutting elements of the cutter 213 are mounted on a second mounting means comprising the back plate and end supports of the cutter 213 as has been described with reference to previous figures. The rotor 207 and the cutter 213 are both mounted on a transfer means constituted by the two side members 211 positioned on either side of the implement 205. The side members 211 are braced across the bottom by the cutter 213 and across the top by a cross tie 214. The rotor 207 is journalled into the side members 211 to allow rotation about a substantially horizontal axis, and the whole structure of the rotor 207, cutter 213, cross tie 214 and side members 211 is pivoted on pivot means to pivot about the pivot axis 210 spaced from the beater axis 108 by a distance small compared with the distance between the beater axis 208 and the cutter 213. The purpose of this eccentric pivoting mounting will be explained hereinafter with reference to FIG. 13.

The agricultural implement 205 also includes drive means 215 for driving the beaters in rotation and for driving the reciprocatory cutter, by suitable gearing means which may be as described hereinbefore with reference to previous figures.

As can be seen in the plan view of FIG. 12, the cutting and conditioning implement 205 is mounted in front of and centrally of the forage harvester 200 and is mounted in an off-set position from the towing tractor (not shown) as has been described hereinbefore, for example, with reference to FIG. 4. The rotor 207 and cutter 213 are driven from the power take-off of the tractor into a drive means 215 (which may also be as herinbefore described) and the forage harvester rotary elements are driven by a shaft 216 leading from the drive means 215 to a gear-box 217 on the forage harvester.

Referring now mainly to FIG. 11, there are positioned between the cutting and conditioning implement 205 and the intake and compaction rollers 218 and 219 of the forage harvester 200, two vertical deflector plates 219 and 220 positioned one on each side of the housing 201 and two adjustable crop deflectors 221 and 222. The crop deflector 222 is pivotable about a pivot 223 and is positioned by a pin 224 located in guide slots 225 in the side walls of the housing 201. The crop deflector 221 is pivoted at a pivot 226 about an arc defined by a pin 227 extending into guide slots 228 in the side walls of the housing 201. The end of the crop deflector 221 carries an adjustable extension 229 by which the length of the crop deflector 221 can be adjusted and locked by a locking screw 230. The extension 229 cooperates with a sliding stone deflector 231 positioned transversely across the roof of the shroud 209 between the implement 205 and the forage harvester 200 to separate the stones from conditioned crop as will be described hereinafter and in the parent of this application, U.S. Pat. No. 3,977,165. The crop deflectors 221 and 222 each consist of metal plates extending across the width of the housing 201.

The forage harvester 200 is of conventional design and comprises intake and compaction rollers 218 and 219, a feed conveyor 235 and an overhead floating roller 236. The conveyor 235 and roller 236 feed crop through further guide rollers 237 and 238 to a precision chopper 239 which impels the chopped crop along a conduit 240 to the delivery chute 204.

There will now be described with reference to FIGS. 11 and 13, respectively, the two main dispositions of the beater rotor 207 and the cutter 213 which may be operated with the forage harvester 200 depending on the crop conditions and operation required. (A third disposition will then be described with reference to FIG. 14, which third disposition corresponds to the use of the implement 205 as has been described with reference to previous figures.)

In FIG. 11, the mahcine is shown in a first, cutting disposition in which the cutter 213 is positioned below the beater rotor 207, with the cutter positioned to cut crop and the beaters 206 positioned in cooperating relationship with the cutter 213 so as to condition crop cut by the cutter before the cut crop falls to the ground. The crop deflectors 222 and 221 are positioned in their highest and lowest positions, respectively, to leave a channel between the two crop deflectors to pass crop to the intake and compaction rollers 218 and 219 of the forage harvester. In operation, the rotor 207 impels the conditioned crop along a trajectory leading between the crop deflectors 221 and 222 to the rollers 218 and 219, but the beaters 206 impel any stones picked up along a different, higher trajectory. The stones then strike the stone deflector 231 and are deflected downwards between the rotor 207 and the lower crop deflector 221. The stone deflector 231 is adjustable by sliding movement in the roof of the shroud 209 along the line of travel of the machine and the extension 229 is adjustable to allow a suitable gap between the rotor 207 and the crop deflector 221 to pass the deflected stones to the ground.

Figure 13:
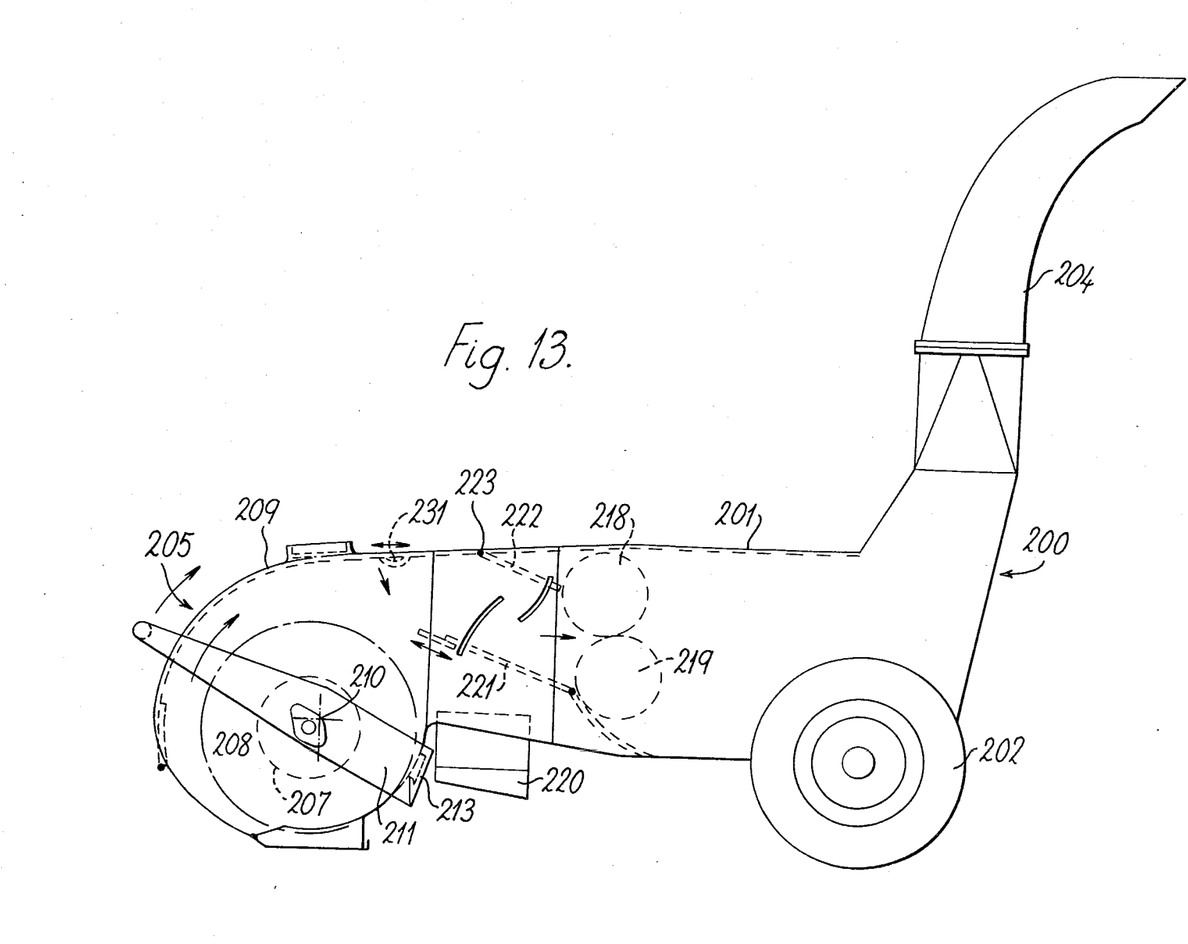
FIG. 13 is a side view of the machine of FIG. 11 arranged in a second, non-cutting disposition.

In FIG. 13, the machine is shown in a second non-cutting disposition in which the cutter 213 is pivoted by the side members 211 about the pivot axis 210 to a position behind the axis 208 of the rotor 207. In this position, the cutter 213 is rendered inoperative to cut crop and, in addition, the drive from the drive means 215 may be disconnected from the cutter 213 if required. In this second disposition, the crop deflectors 221 and 222 and the stone deflector 231 may remain in the same position as for FIG. 16. The beaters 206 are moved by the said eccentric action to a lower position relative to the main frame where they are now positioned to engage cut crop lying on the ground. The previously cut crop is picked up and conditioned and passed between the crop deflectors 221 and 222 to the intake rollers 218 and 219 of the forage harvester. The stone deflector 231 again operates to separate the stones from the conditioned crop. Thus, in the second, non-cutting disposition, the beater rotor 207 is positioned lower than its position in the first cutting disposition and the cutter 213 is positioned higher and rearwardly of its position in the first cutting position.

Figure 14:
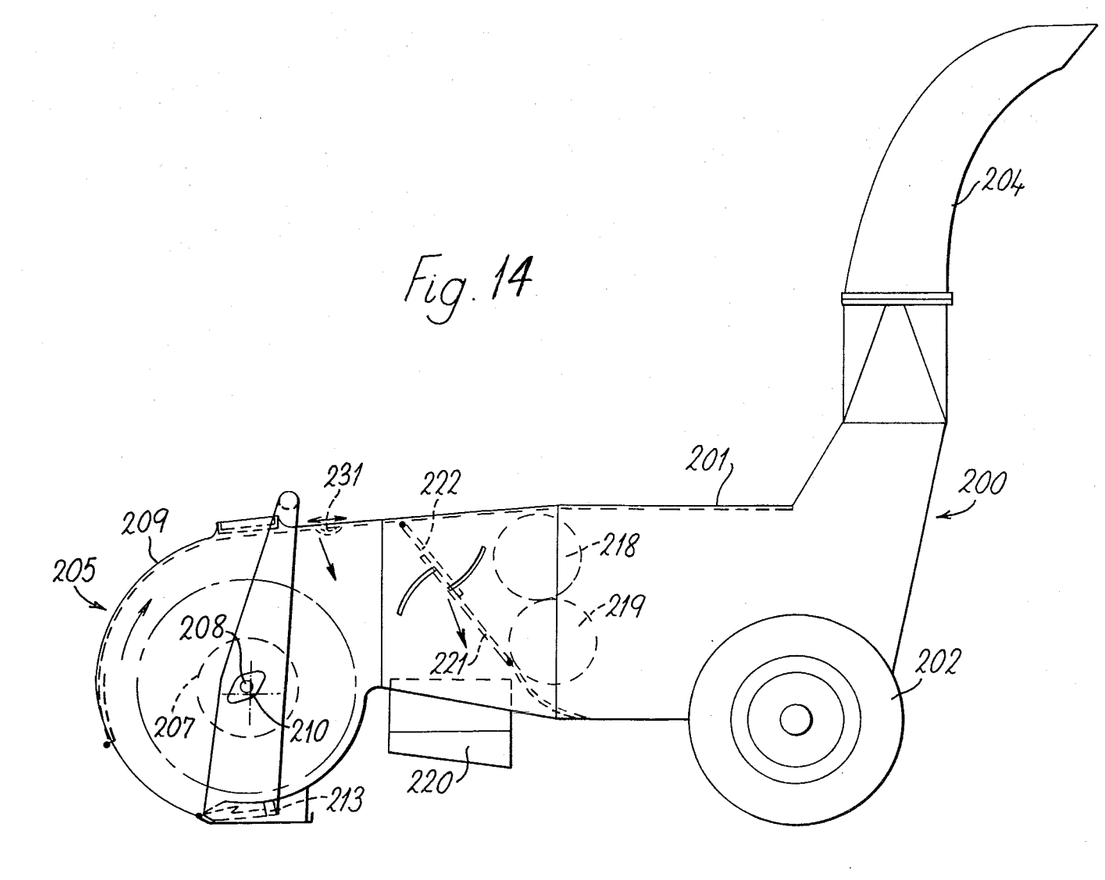
FIG. 14 is a side view of the machine of FIGS. 11, 12 and 13, arranged to render the forage harvester inoperative.

Referring now to FIG. 14, the machine may be operated in a third disposition, in which the beater rotor 207 and the cutter 213 are positioned as for the first cutting disposition of FIG. 11, but the crop deflectors 221 and 222 are positioned, respectively, in their upper and lower positions so as to form a continuous deflector arrangement deflecting cut and conditioned crop away from the rollers 218 and 219 and down to the ground. The crop so cut and conditioned is also deflected by the deflectors 220 which form a swarf of conditioned crop. In the third disposition of FIG. 14, the implement 205 operates as a cutting and conditioning device such as has been described with reference to previous figures and the forage harvester 200 is not used. In such operation, the drive member 216 may be disconnected from the forage harvester 200.

Thus it will be seen that when the implement embodying the present invention for cutting and/or conditioning crop is coupled to a forage harvester, a versatile machine is produced capable of operating in three different modes of operation. The stone separation by the adjustable stone deflector allows an improved high speed device whether in the first or second dispositions, as previously known forage harvesters are severely limited by the damage caused to the precision chopper by stones which are passed by the intake rollers. For this reason, conventional forage harvesters pick up previously cut crop by lifting tines which are relatively slow.

The conditioning beaters 206 of the present invention also serve a useful function in that some stones which are collected are thrown forwards of the machine rather than passing to the stone deflector 231, and such stones and other stones may be ridden over by the cutter on skids 213.

The well known advantages of a precision chopper over conventional forage harvesters using flail cutting can be made available by embodiments of the present invention at a much higher speed than previously obtained with a precision chopper. A main advantage of the embodiments described in FIGS. 11–14 over conventional multi-purpose forage harvesters is the ease with which the disposition of the elements can be changed from cutting to non-cutting disposition, as compared with an arrangement in which the whole front end of the forage harvester would need to be removed and changed in order to change from a cutting disposition to a noncutting disposition.

There will now be described, with reference to FIG. 15, an alternative arrangement of a combination of a cutting and conditioning implement according to the present invention with a forage harvester. Elements in FIG. 15 which correspond to elements in FIGS. 11–14 will be indicated by like reference numerals. Most of the description of the operation of the embodiment of FIG. 15 corresponds to that of FIGS. 11–14, so that the description will merely be of the differences.

Figure 15:
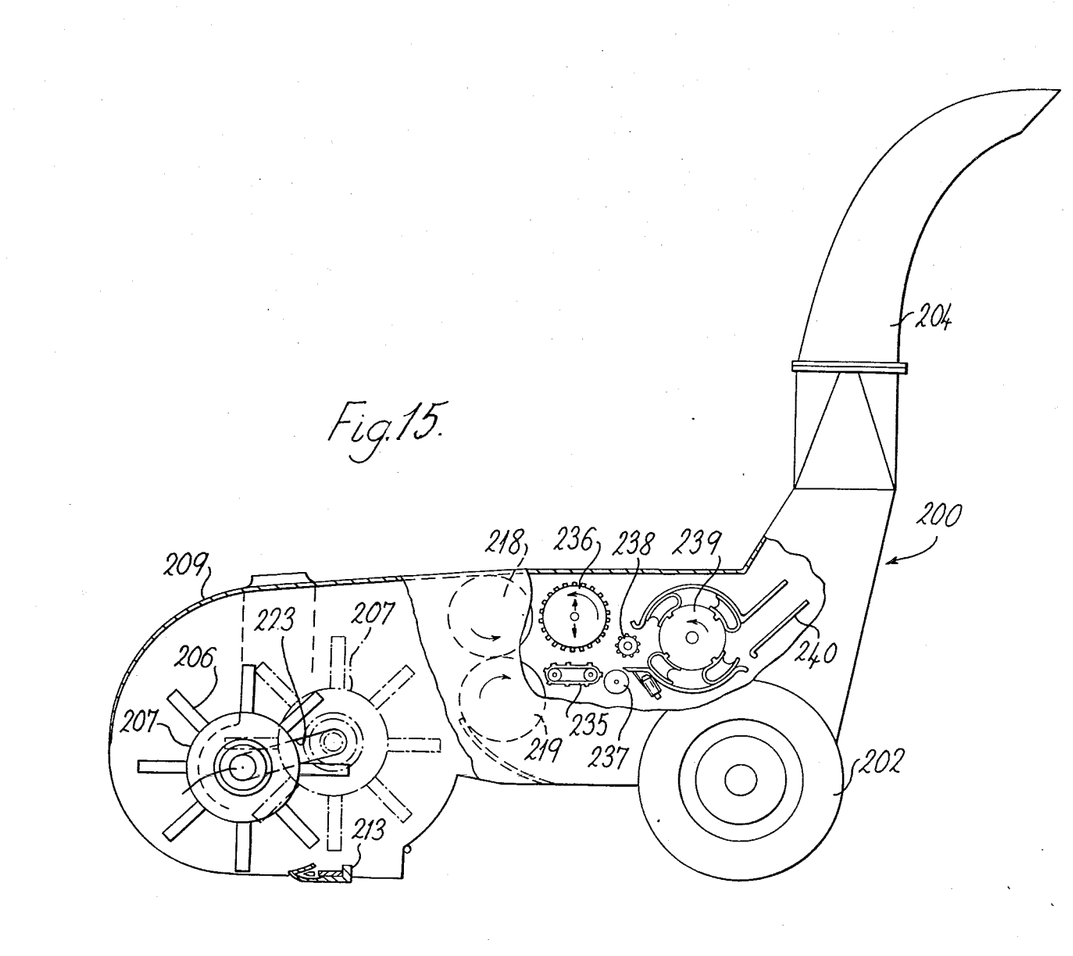
FIG. 15 is a side view of an alternative arrangement for coupling an implement embodying the invention to a forage harvester.

In the embodiment of FIG. 15, the rotor 207 is mounted on the main frame by an adjustable trunnion means 232 which is mounted to slide along a slot 233 in the main frame 210. The slot is inclined to the horizontal and allows movement of the rotor 207 from a position directly above the cutter 213 (shown in dotted lines in FIG. 15) and a position forward of the cutter bar 213 (shown in full lines in FIG. 15). In the former position, the shroud 209 slides back with the rotor.

When the rotor 207 is positioned directly above the cutter 213, the rotor 207 and the cutter 213 are in a first cutting disposition such that in operation the cutter 213 cuts standing crop, which is conditioned by the beaters 207 and impelled to the intake rollers 218 and 219 of the forage harvester. When the rotor 207 is mounted at the lower end of the guide slots 233, it is positioned in a second non-cutting disposition, in which the cutter 213 is rendered inoperative. In this second disposition, the beaters 206 engage previously cut crop lying on the ground and condition it and pass it to the intake rollers 218 and 219.

It will be appreciated that the elements shown in FIG. 15 are positioned to illustrate the general arrangement of the alternative embodiment but are provided merely by way of diagrammatic representation.

What is claimed:

1. An agricultural implement for conditioning crop, comprising:
   a frame for movement over a crop to be cut;
   a cutter having at least one cutting element;
   means mounting said cutter on said frame;
   means driving said cutting element relative to said frame for cutting the crop over which said frame is moving;
   a conditioning rotor for conditioning said crop;
   means driving the conditioning rotor in rotation about a substantially horizontal axis in a sense such that, at the lowermost point of the movement of the conditioning rotor, the rotor moves in the same direction as the intended direction of forward travel of the implement;
   hood means extending over the conditioning rotor and defining a space through which crop is carried by the rotary motion of the conditioning rotor; and
   mounting means mounting the conditioning rotor on said frame in a position such that the rotor extends across at least part of the path of forward travel of the cutter, the said position of the rotor also being such that the rotor engages crop cut by the cutting element before the cut crop falls to the ground,
   the conditioning rotor comprising a shaft and an array of discrete conditioning elements mounted for rotation and distributed axially along said shaft, each conditioning element comprising two arms extending in operation outwardly from said shaft relative to the axis of rotation of the conditioning rotor, the two arms being inclined with respect to each other at an inclined angle not greater than approximately 60° and diverging from each other in the outward direction to each present a narrow, abrading edge to the cut crop, each outwardly extending arm having a length at least four times its width taken in a direction along the axis of the rotor, the arms on the rotor having spacing and length relative to their width for enabling the elements to penetrate and move through the crop while it is being conveyed by the rotor, and for conditioning the crop by abrasion between the crop and the conditioning elements passing through the crop.

2. An implement according to claim 1 wherein the two arms of each conditioning element are inclined with respect to each other at an inclined angle of approximately 30°.

3. An agricultural implement as claimed in claim 1 wherein said cutter is a reciprocatory cutter in which said at least one cutting element is reciprocatory across said intended direction of travel of the implement.

4. An agricultural implement as claimed in claim 3 wherein said mounting means mounts said conditioning rotor with said axis of rotation substantially immediately above said cutter.

5. An agricultural implement as claimed in claim 1 wherein said cutter is a rotory cutter in which said at least one cutting element is mounted for rotation about a substantially vertical axis.

6. An agricultural implement as claimed in claim 1 wherein said arms are disposed in the form of a "V" with the apex of the "V" form directed towards the rotor.

7. An agricultural implement as claimed in claim 1 including means for mounting said conditioning elements on said rotor so that each conditioning element yields upon impact with an obstacle more solid than the crop to be conditioned.

8. An agricultural implement as claimed in claim 7 wherein each conditioning element is formed at least in part of resilient material.

9. An agricultural implement as claimed in claim 7 wherein said element mounting means includes means for pivotably mounting each said conditioning element so that, upon an impact such as aforesaid, said element pivots between an operating position in which the element angle relative to a radius of said common axis passing through the pivot point of said conditioning element is a predetermined angle and a relief position in which the element angle is greater than said predetermined angle.

10. An agricultural implement as claimed in claim 9 further including means for constraining in operation each conditioning element in said operating position.

11. An agricultural implement as claimed in claim 10 wherein said constraining means includes at least one shear pin.

12. An agricultural implement as claimed in claim 10 wherein said constraining means includes spring means acting against at least one stop.

13. An agricultural implement as claimed in claim 7 wherein the conditioning elements are mounted in groups so that the elements of each group are fixed relative to each other but are movable upon an impact such as aforesaid relative to elements in other groups.

14. An agricultural implement as claimed in claim 13 wherein said element mounting means includes means for mounting each of said conditioning elements of each group on a common support member which is pivotable about an axis parallel to but spaced from said rotor axis.

15. An agricultural implement as claimed in claim 1 in which the hood means extends over the rotor in an arrangement such that said hood means, over an initial portion at the crop entry end thereof, is non-convergent, in the direction of travel of the tips of the conditioning elements, with the path travelled by the tips of the conditioning elements.

* * * * *